United States Patent [19]

Sakamoto et al.

[11] Patent Number: 5,023,291

[45] Date of Patent: Jun. 11, 1991

[54] POLYESTER COMPOSITION

[75] Inventors: Seiji Sakamoto, Machida; Nobuyasu Shudo, Yokohama, both of Japan

[73] Assignee: Diafoil Company, Limited, Tokyo, Japan

[21] Appl. No.: 379,346

[22] Filed: Jul. 13, 1989

[30] Foreign Application Priority Data

Jul. 21, 1988 [JP] Japan .................... 63-182358

[51] Int. Cl.$^5$ .......................... C08K 3/20; C08K 7/18; C08G 63/183; C08G 63/187
[52] U.S. Cl. .................... 524/430; 524/605; 524/786; 524/604
[58] Field of Search ............ 524/430, 605, 786

[56] References Cited

U.S. PATENT DOCUMENTS

| 4,092,289 | 5/1978 | Remmington | 524/786 |
| 4,096,109 | 6/1978 | Watanabe et al. | 524/112 |
| 4,218,887 | 12/1983 | Horie et al. | 524/317 |
| 4,331,800 | 5/1982 | Inata et al. | 525/437 |
| 4,436,894 | 3/1984 | Urasaki et al. | 528/194 |
| 4,448,931 | 5/1984 | Sugio et al. | 525/905 |
| 4,539,389 | 9/1985 | Kiriyama et al. | 525/437 |

FOREIGN PATENT DOCUMENTS 0187176 7/1986 European Pat. Off. .
1459810 12/1976 United Kingdom .

Primary Examiner—Thurman K. Page
Assistant Examiner—E. Wehman
Attorney, Agent, or Firm—Oblon, Spivak, McClelland, Maier & Neustadt

[57] ABSTRACT

Disclosed herein is a polyester composition which comprises a polyester with a terminal carboxyl group content of 40 to 80 equivalents/$10^6$ and 0.0 to 5 wt %, based on the total amount of the polyester composition, aluminum oxide particles of 0.005 to 5 μm in average particle diameter and which has a melt resistivity of $6 \times 10^6$ to $5 \times 10^8$ Ω.cm.

By using the polyester composition, it is possible to successively produce a film having excellent wear resistance and flatness over a long production run.

6 Claims, No Drawings

POLYESTER COMPOSITION

BACKGROUND OF THE INVENTION

The present invention relates to a polyester composition which is capable of providing a film having excellent wear resistance and flatness. More particularly, the present invention relates to a polyester composition which permits lengthy film production runs and produces films having excellent wear resistance and flatness, which characteristics are in increasing demand for base films of magnetic recording media.

Polyester films, which are excellent in physical and chemical properties, have been widely used as a base material of various products. Above all, a biaxially oriented polyethylene terephthalate film, which is excellent especially in mechanical strength and dimensional stability, has now become essential as a base film of magnetic recording media. With the increase in the running speed of a magnetic recording tape, films must exhibit enhanced wear resistance. This is because scratches are readily produced on films which come into contact with a guide pin and the like at a high speed, and such scratches cause defects on the surface of a magnetic layer, thereby deteriorating the electromagnetic characteristics. In addition, a substance in the form of a white powder which is scraped off the film and which adheres to the surface of a magnetic layer also often deteriorates the magnetoelectric characteristics of the recording media.

As a result of investigation on the improvement of wear resistance, the present inventors have found that the presence of a specific amount of aluminum oxide particles having a specific particle diameter in a polyesters film is very effective for improving the wear resistance thereof. However, if a polyester composition containing such particles is used for film formation for long hours, a deteriorated substance is gradually produced on the lip portion of the die of an extruder, which produces stripes on the film, thereby impairing the flatness of the film.

As a result of research for solving this defect, the present inventors have found that the use of a polyester composition which comprises a specific amount of aluminum oxide particles and a polyester with a terminal carboxyl group content higher than that of an ordinary polyester and which has a melt resistivity of a specific range can stably produce a film having excellent wear resistance and flatness extending over long hours. The present invention has been achieved on the bases of this finding.

SUMMARY OF THE INVENTION

In a first aspect of the present invention, there is provided a polyester composition which comprises a polyester with a terminal carboxyl group content of 40 to 80 equivalents/$10^6$ g and 0.01 to 5 wt %, based on the total amount of polyester composition, of aluminum oxide particles of 0.005 to 5 $\mu$m in average particle diameter, and which has a melt resistivity of $6 \times 10^6$ to $5 \times 10^8$ $\Omega$-cm.

In a second aspect of the present invention, there is provided a process for producing a biaxially oriented polyester film for long hours in succession by using the above-described polyester composition.

DETAILED DESCRIPTION OF THE INVENTION

The present invention will be explained in detail hereinunder.

The polyester in the present invention refers to a polyester obtained by using an aromatic dicarboxylic acid such as terephthalic acid and 2,6-naphthalenedicarboxylic acid or an ester thereof and an ethylene glycol as the main starting materials, but it may contain another material as a third component. As the dicarboxylic acid component, at least one selected from the group consisting of isophthalic acid, phthalic acid, 2,6-naphthalenedicarboxylic acid, terephthalic acid, adipic acid and sebacic acid is usable. As the glycol component, at least one selected from the group consisting of diethylene glycol, propylene glycol, butanediol, 1,4-cyclohexane dimethanol and neopentyl glycol is usable. It is also possible to use at least one oxycarboxylic acid component such as p-oxyethoxybenzoic acid.

In the present invention, it is preferable that not less than 80 mol % of the constitutional repeating unit of polyester is an ethylene terephthalate unit or an ethylene-2,6-naphthalene unit.

The average particle diameter of the aluminum oxide particles contained in the polyester composition of the present invention is 0.005 to 5 $\mu$m, preferably 0.01 to 1 $\mu$m, more preferably 0.01 to 0.5 $\mu$m.

If the average particle diameter of the aluminum oxide particles exceeds 5 $\mu$m, the particles often slip off the surface of the film, thereby increasing the wearing out of powder from the film.

As an example of aluminum oxide particles preferably used in the present invention, the aluminum oxide particles obtained by what is called a thermal decomposition method can be used. These particles are ordinarily produced by the flame hydrolysis of anhydrous aluminum chloride, and the particle diameters thereof are about 0.01 to 0.1 $\mu$m. In the present invention, the aluminum oxide particles obtained by the hydrolysis of alkoxide are also preferably usable In this case, $Al(OC_3H_7)_3$ or $Al(OC_4H_9)_3$ is ordinarily used as a starting material, and the conditions for hydrolysis are appropriately selected to obtain fine particles not more than 1 $\mu$m in diameter. In this case, it is naturally possible to adopt a method of adding an acid to the slurry obtained to produce a transparent sol, and heating the sol after gelation to a temperature of not lower than 500° C to obtain a sintered form. Alternatively, the aluminum oxide fine powder obtained by another method such as a method of adding methyl acetate or ethyl acetate to a sodium aluminate solution, stirring the mixture to obtain AlOOH AlO(OH) and heating AlOOH AlO(OH) may be used.

In the present invention, the aluminum oxide particles are preferably used after being completely dispersed in the form of primary particles, but so long as they do not exert a deleterious influence on the surface state of a film, some coagulation of the particles in the form of secondary particles may be tolerated. Even in this case, the apparent average diameter of the particles is 0.005 to 5 $\mu$m, preferably 0.01 to 1 $\mu$m, more preferably 0.01 to 0.5 $\mu$m.

A part of, e.g., not more than 30 wt % of aluminum oxide may be replaced by an oxide of Si, Ti, Fe. Na, K or the like.

The particle size distribution of the aluminum oxide particles used in the present invention is not specified, but the particles showing a particle size distribution curve as sharp as possible are preferable. To state this more precisely, the particles having a particle size distribution ratio $\gamma$ defined by the following formula:

$$\gamma = \frac{D_{75}}{D_{25}}$$

wherein $D_{75}$ represents the particle diameter of the particle when the cumulative weight calculated from the minimum particle diameter amounts to 75% of the total weight, and $D_{25}$ represents the particle diameter of the particle when the cumulative weight calculated from the minimum particle diameter amounts to 25% of the total weight, is not more than 2.0, preferably not more than 1.5 are preferably used.

The shapes of these particles are not specified either, but the particles being bulky or spherical in shape are preferably used. To state this more precisely, the particles having a volumetric shape parameter $\phi_v$ represented by the following formula:

$$\phi_v = \frac{V}{D^3}$$

wherein V represents the volumes ($\mu m^3$) of the particles and D the maximum diameter in the projection of the particles, is 0.1 to $(\pi/6)$, preferably 0.2 to $(\pi/6)$ are preferred.

The specific surface area is not specified and the particles having a specific surface area of less than about 500 $m^2/g$ are preferably used.

The aluminum oxide particles with the surfaces treated with various surface treatments such as a silane coupling agent and a titanium coupling agent also exert sufficient advantages in the present invention.

These aluminum oxide particles are mixed with a polyester after they are pulverized, classified or filtered, if necessary. For pulverization of the particles, rod mill, ball mill, oscillation rod mill, oscillation ball mill, pan mill, roller mill, impact mill, agitation grinding mill, fluid energy mill, etc. are usable. For classification of the particles, classifiers such as semi-free vortex, forced vortex, hydrocyclone, and centrifugal separation system classifiers can be adopted.

As a method of mixing the particles with a polyester, a method of adding the particles to the reaction system in the form of an ethylene glycol slurry at the initial stage of the production of a polyester is preferably adopted, but a method of blending directly with a polyester before film formation may also be adopted.

In the present invention, the content of the aluminum oxide particles contained in the polyester composition is 0.01 to 5 wt %, preferably 0.05 to 3 wt %, more preferably 0.1 to 0.8 wt % based on the polyester composition. If the content is less than 0.01 wt %, the scratch resistance of the film formed from the polyester composition is hardly improved. Addition of more than 5 wt % of aluminum oxide particles is also unfavorable because it frequently produces coarse protrusions which deteriorate the electromagnetic characteristics without improving the scratch resistance any further.

The polyester composition of the present invention may contain particles other than aluminum oxide particles which are essential in the present invention so as to improve the running property and the wear resistance of the film. As examples of the particles added together with aluminum oxide particles, the following particles will be cited: (1) particles having a diameter of about 0.1 to 5 $\mu m$ produced by separating out the residue of a catalyst for polycondensation in the presence or absence of a phosphorus compound; (2) inorganic particles other than aluminum oxide particles having an average particle diameter of about 0.01 to 5 $\mu m$ and a Mohs hardness of less than 8, for example, kaolin, calcium carbonate, silicon dioxide, titanium dioxide, barium sulfate, and zeolite particles; and (3) organic particles of a heatresistant polymer compound having an average particle diameter of about 0.01 to 5 $\mu m$, for example, organic particles of a thermosetting phenol resin, a thermosetting epoxy resin, a thermosetting urea resin, a benzoguanamine resin, and a copolymer produced by the reaction of a compound having only one aliphatic unsaturated group in a molecule and a compound having at least two aliphatic unsaturated groups in a molecule such as those described in Japanese Patent Publication No. 59-5216 (1984).

As described above, the present invention is characterized by using a polyester composition containing a specific amount of aluminum oxide particles having a specific particle diameter in order to effectively improve the scratch resistance of the film produced from the polyester composition. The other characteristic of the present invention is that the content of the terminal carboxyl group of the polyester is adjusted in a specific range.

Generally, when a film is formed from a polyester composition containing aluminum oxide particles for long hours in succession, a deteriorated substance is gradually produced on the lip portion of a die, which produces a strips on the film. However, it has unexpectedly been found that if the content of the terminal carboxyl group of the polyester is 40 to 80 equivalents/$10^6$ g, which is higher than that of an ordinary polyester, namely, 5 to 35 equivalents/$10^6$ g, the generation of the deteriorated substance is greatly reduced. The content is preferably 45 to 75 equivalents/$10^6$ g, more preferably 50 to 70 equivalents/$10^6$ g. If the value is less than 40 equivalents/$10^6$ g, almost no effect is observed on the prevention of the generation of the deteriorated substance. On the other hand, if the content exceeds 80 equivalents/$10^6$ g, the thermal decomposition of the polyester is accelerated too much and the flatness of the film is deteriorated.

The reason why the generation of the deteriorated substance is suppressed under the above-described condition is not clear, but it is considered that when the content of the terminal carboxyl group is in a specific range larger than that of an ordinary polyester, the decomposition rate of the deteriorated substance such as a gel mainly composed of polyester, which is produced at the lip portion of the die by some action of the aluminum oxide particles, is accelerated to an appropriate degree, which results in the suppression of the generation of the deteriorated substance.

It is necessary to adopt a special polymerization method such as those which will be described in the following in order to obtain a polyester with the terminal carboxyl group content higher than that of an ordinary polyester: (1) a method of using a larger amount of metal compound such as Mg, Mn, Zn, Ca and Li compounds, which is used in an ester exchange reaction or esterification compared with that used in the production of an ordinary polyester; (2) carrying out a polymerization reaction at a later stage thereof while maintaining a higher temperature than the temperature in the production of an ordinary polyester and/or prolonging the polymerization time; and (3) copolymerizing monomers which are comparatively susceptible to thermal decomposition such as polyalkylene glycol in an amount of 0.1 to 20 mol %, preferably 0.3 to 5 mol % based on the glycol component. The intrinsic viscosity [0] of the polyester with the terminal carboxyl group content higher than that of an ordinary polyester, which is obtained by a method selected from the methods (1) to (3), is ordinarily 0.57 to 0.75, preferably 0.58 to 0.68.

In addition, the polyester composition of the present invention may contain a so-called regenerated polymer in a given amount, usually 10 to 50 wt % based on the polyester.

As described above, according to the present invention, it is possible to produce a film having an excellent flatness by suppressing the generation of a deteriorated substance at the lip portion of a die by the action of the aluminum oxide particles and a polyester with a terminal carboxyl group content in a specific range. This effect is produced more prominently by maintaining the atmosphere of the lip portion in a specific state. More specifically, it is possible to reduce the generation of a deteriorated substance by maintaining the temperature of the lip portion at 200° to 330° C., preferably 250° to 320° C., and the relative humidity at 30 to 100%, preferably 60 to 100%. This is considered to be probably because of an appropriate decomposition of the deteriorated substance.

In addition, when the resistivity in a molten state (melt resistivity) of the polyester composition of the present invention is in a specific range, it is possible to obtain a film having a still more excellent flatness.

In order to produce a film from the polyester composition of the present invention, the polyester composition is generally extruded into a sheet form through a lip of an extruder in a temperature range of 280° to 310° C. After the sheet is cooled to 40° to 70° C. so as to obtain a substantially amorphous sheet, the sheet is stretched to 4 to 20 times by area in the machine and transverse directions at a temperature of 80° to 140° C., thereby obtaining a biaxially oriented film. Thereafter, the thus-obtained film is subjected to heat treatment in a temperature range of 150° to 240° C. for 1 to 600 seconds. It has been found that if what is called an electrostatic cooling method is adopted for obtaining the amorphous sheet and the melt resistivity of the polyester composition is $6 \times 10^6$ to $5 \times 10^8$ $\Omega$·cm, it is possible to obtain a film having a still more excellent flatness.

The electrostatic cooling method is a method of applying electrostatic charges to the sheet so that the sheet is firmly contacted to a rotary cooling drum for rapid cooling when the amorphous sheet is produced from the molten polymer, as described in, for example, Japanese Patent Publication No. 37-6142 (1962). This method is effectively applied especially when the melt resistivity of the polyester composition containing aluminum oxide particles of the present invention is in the above-described range and the flatness of the film produced is further improved. The more preferred range of the melt resistivity is $8 \times 10^6$ to $1 \times 10^8$ $\Omega$·cm.

The melt resistivity of the polyester composition is controlled in the following way.

In order to reduce the melt resistivity, the dissolved amount of a metal or a metal compound in the polyester is increased. For this purpose, a method of adding a comparatively small amount of, for example, not more than an equimolar amount of phosphorus compound to the metal element used as the catalyst for the ester exchange reaction or the metal element added during or after the esterification as occasion demands is preferably adopted.

On the other hand, in order to increase the melt resistivity, the amount of metal element dissolved in the polyester is reduced. For example, the amount of metal compound soluble in the reaction system and added thereto is reduced or when a large amount of metal compound is used, most of the metal compound is precipitated in the form of a metal salt insoluble in the polyester such as a carboxylate, phosphate and phosphite. More specifically, this aim is achieved by reacting not less than an equimolar amount of phosphorus compound with a metal element such as calcium and manganese which has been used as the catalyst for the ester exchange reaction.

Appropriate adoption of these methods facilitates the control of the melt resistivity of the polyester composition in the range of $6 \times 10^6$ to $5 \times 10^8$ $\Omega$·cm.

EXAMPLES

The present invention will be explained in detail with reference to the following non-limiting examples. "Part" in the examples and comparative examples represents "part by weight".

Various properties in the examples and comparative examples were measured as follows.

(1) Average particle diameter

The particle sizes were measured under a microscope and the diameter of the particle when the cumulative volume in the distribution of the equivalent sphere volume was 50% was regarded as the average particle diameter.

(2) Content of terminal carboxyl group

The content was obtained by a method of A. Conix (Makromol. Chem., 26, 226 (1958)).

(3) Resistivity of polyester composition in molten state

The resistivity was obtained by a method described in Brit. J. Appl.Phys., vol. 17, pp. 1149 to 1154 (1966). The temperature for melting the polymer was 295° C. and the value obtained immediately after the application of a DC voltage of 1,000 V was regarded as the resistivity of the polymer in a molten state.

(4) Flatness of film

The thickness of a film was measured at 10 points at regular intervals of 1,000 m in the machine direction and at 10 points at regular intervals of 10 cm in the transverse direction, namely 100 points in total.

An electron micrometer produced by Anritsu Corp. was used for measuring the thicknesses of a stack of ten sheets of film at the corresponding points and the thicknesses of each sheet was calculated. On the assumption that, of all the measured values, the maximum value was Xmax, the minimum value Xmin and the arithmetic mean value $\overline{X}$, the flatness of film was obtained from the following formula:

$$\frac{X_{max} - X_{min}}{\overline{X}} \times 100$$

The smaller the value, the more preferable.

(5) Scratch resistance

A film was run at the rate of 4 m/sec in the state of being brought into contact with a metal pin (diameter 6 mm, surface roughness: 3S) plated with hard chromium at a contact angle of 135° and a tensile force of 50 g.

Aluminum was deposited on the contact surface of the film and the degree of scratch was visually judged in accordance with the following five ranks.

Rank 1: Many scratch were observed and most of them were deep.
Rank 2: Comparatively many scratch were observed and some of them were deep.
Rank 3: Comparatively small scratch were observed and few of them were deep.
Rank 4: A few scratch were observed but satisfactory for practical use.
Rank 5: Almost no scratch were observed.

EXAMPLE 1

100 parts of dimethyl terephthalate, 70 parts of ethylene glycol and 0.20 part of magnesium acetate tetrahydrate were charged into a reaction vessel and methanol was distilled off while heating the reaction vessel for carrying out an ester exchange reaction. The temperature rose to 230° C. after 4 hours of the start of the reaction, and the ester exchange reaction was substantially finished.

Thereafter, 0.50 part of aluminum oxide particles having an average particle diameter of 0.05 μm was added to the reaction product in a form of 10 wt % ethylene glycol slurry. After further adding 0.07 part of ethyl acid phosphate and 0.04 part of antimony trioxide to the mixture, polymerization was carried out by an ordinary method except that the temperature was maintained at 290° C. for 30 minutes at the final stage of the reaction. In 6 hours in total, a polyester having an intrinsic viscosity of 0.63, and 50.2 equivalents/$10^6$ g of a terminal carboxyl group content. The resistivity of the polyester in a molten state was $2 \times 10^7$ Ω·cm.

A biaxially oriented film was produced from the polyester. The polyester was extruded from an extruder at 290° C. into a sheet and an amorphous sheet of 200 μm thick was obtained by an electrostatic cooling method. A tungsten wire 0.1 mm in diameter was stretched on the sheet in the direction orthogonal to the flow of the sheet and a DC voltage of 8 KV was applied to the sheet. The atmosphere of the lip portion was maintained at a temperature of 280° to 300° C. and a relative humidity of 80%. The amorphous sheet was stretched by 3.5 times in the machine direction and by 3.4 times in the transverse direction. The stretched sheet was subjected to heat treatment at 225° C. for 3 seconds, thereby obtaining a biaxially oriented polyester film of 15 μm thick.

The properties of the thus-obtained film are shown in Table 1 together with those of the films obtained in the other example and comparative examples. The film obtained in Example 1 was excellent in scratch resistance and the flatness of the film examined 24 hours after the start of film formation exhibited a very favorable state.

EXAMPLE 2

A film was obtained in the same way as in Example 1 except that the polyester composition shown in Table 1. was used. All the film properties evaluated were favorable.

COMPARATIVE EXAMPLES 1 TO 4

Films were obtained in the same way as in Example 1 except that each polyester composition shown in Table 1 was used, and the film properties were evaluated. As is clear from Table 1, in Comparative Example 1, wherein the particles added were calcium carbonate particles, the scratch resistance of the film was insufficient. In Comparative Example 2, wherein although aluminum oxide particles were added, the content of terminal carboxyl group was 40 equivalents/$10^6$ g Therefore, the deteriorated substance at the lip portion was difficult to be decomposed and the flatness of the film after a long-time film formation was deteriorated.

In Comparative Example 3 which is an example of using a polyester composition having a melt resistivity of more than $5 \times 10^8$ Ω·cm, the flatness of the film obtained was improper. In Comparative Example 4, wherein the amount of aluminum oxide particles added was too small, the scratch resistance of the film was insufficient.

TABLE 1

| | Polyester composition | | | | | Film properties | | |
| | Particles added | | Content of | | | | Flatness (%) | |
| | Kind | Average particle size μm | Content wt % | terminal carboxyl group equivalents/$10^6$ g | Melt resistivity Ω·cm | Scratch resistance | Immediately after start of film formation | 24 hours after start of film formation |
|---|---|---|---|---|---|---|---|---|
| Example 1 | $Al_2O_3$ | 0.05 | 0.50 | 50.2 | $2 \times 10^7$ | 5 | 8 | 8 |
| Example 2 | $Al_2O_3$ | 0.20 | 0.70 | 55.0 | $3 \times 10^7$ | 5 | 8 | 8 |
| Comparative Example 1 | $CaCO_3$ | 0.20 | 0.70 | 55.5 | $3 \times 10^7$ | 1-2 | 9 | 9 |
| Comparative Example 2 | $Al_2O_3$ | 0.20 | 0.70 | 38.7 | $3 \times 10^7$ | 5 | 9 | 13 |
| Comparative Example 3 | $Al_2O_3$ | 0.02 | 0.10 | 52.1 | $7 \times 10^8$ | 4 | 14 | 15 |
| Comparative Example 4 | $Al_2O_3$ | 0.35 | 0.005 | 34.8 | $2 \times 10^7$ | 1 | 8 | 8 |

What is claimed is:

1. A polyester composition, which comprises:
   a polyester containing not less than 80 mol % of repeating units constituted of ethylene terephthalate units or ethylene-2,6-naphthalenedicarboxylate units, said polyester having a terminal carboxyl group content of 40 to 80 equivalents/$10^6$ g and 0.01 to 5 wt. %, based on the total amount of the polyester composition, of aluminum oxide particles of 0.005 to 5 μm in average particle diameter, said polyester composition having a melt resistivity of $6 \times 10^6$ to $5 \times 10^8$ Ω·cm.

2. A polyester composition according to claim 1, wherein the particle size distribution ratio γ of the aluminum oxide particles represented by the following formula:

$$\gamma = \frac{D_{75}}{D_{25}}$$

wherein $D_{75}$ represents the particle diameter of the particle when the cumulative weight calculated from the minimum particle diameter amounts to 75% of the total weight, and $D_{25}$ represents the particle diameter of the particle when the cumulative weight calculated from the minimum particle diameter amounts to 25% of the total weight, is not more than 2.

3. A polyester composition according to claim 1, wherein the volumetric shape parameter $\phi_v$ of the aluminum oxide particles represented by the following formula:

$$\phi_v = \frac{V}{D^3}$$

wherein V represents the volumes ($\mu m^3$) of the particles and D the maximum diameter in the projection of the particles, is 0.1 to $\pi/6$.

4. The polyester composition according to claim 1, wherein the average particle diameter of the aluminum oxide particles ranges from 0.01 to 1 $\mu m$.

5. The polyester composition according to claim 1, wherein the content of terminal carboxyl groups in the polyester ranges from 45 to 75 equivalents/$10^6$ g.

6. The polyester composition according to claim 1, wherein the melt resistivity of the polyester composition ranges from $8 \times 10^6$ to $1 \times 10^8$ $\Omega \cdot cm$.

* * * * *